J. W. LUNDAHL.
SPOON ATTACHMENT.
APPLICATION FILED APR. 30, 1913.
1,074,441.
Patented Sept. 30, 1913.
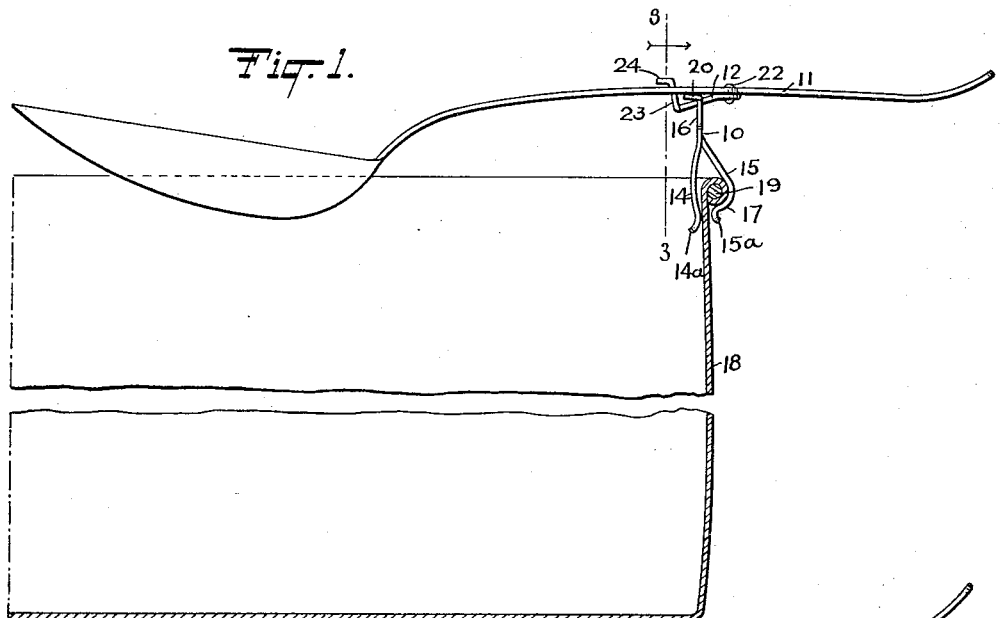
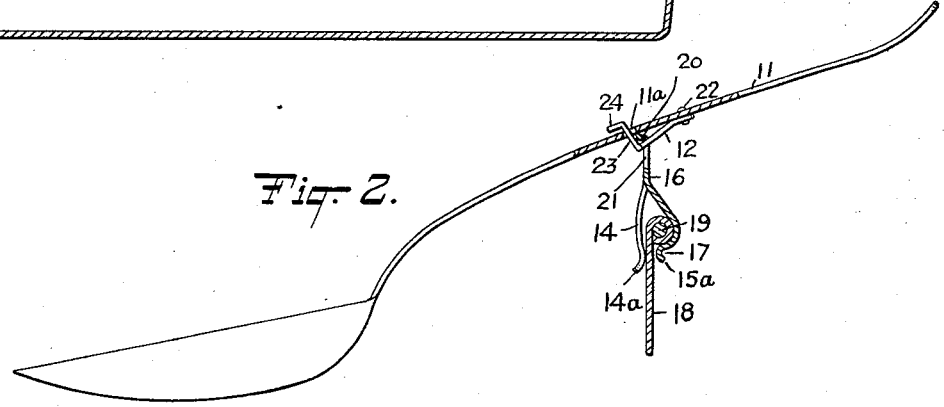
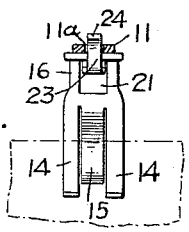
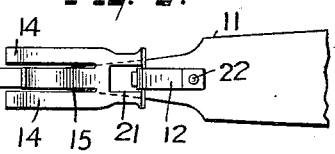
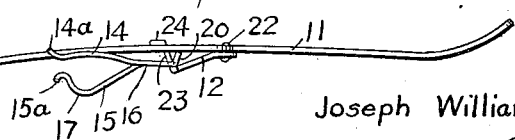
WITNESSES
INVENTOR
Joseph William Lundahl
BY
ATTORNEYS

UNITED STATES PATENT OFFICE.

JOSEPH WILLIAM LUNDAHL, OF THOMASTON, CONNECTICUT.

SPOON ATTACHMENT.

1,074,441.     Specification of Letters Patent.     Patented Sept. 30, 1913.

Application filed April 30, 1913. Serial No. 764,585.

*To all whom it may concern:*

Be it known that I, JOSEPH WILLIAM LUNDAHL, a citizen of the United States, and a resident of Thomaston, in the county of Litchfield and State of Connecticut, have invented a new and Improved Spoon Attachment, of which the following is a full, clear, and exact description.

My invention relates to an attachment to be fixed to the back of a spoon handle and includes a clip adapted to so engage the upper end of a pot, pan or other cooking utensil as to sustain the spoon in position, and a novel device for securing the clip to the handle of the spoon, in a manner to permit the clip to fold against the spoon handle when not in use, or to be turned to approximately a right angle to the handle.

The invention consists in the special form and arrangement of the parts as hereinafter particularly described and defined in the claim.

Reference is to be had to the accompanying drawings, forming a part of this specification, in which similar characters of reference indicate corresponding parts in all the views, and in which—

Figure 1 is a side elevation of my improved device attached to a spoon handle, the cooking utensil being partly shown in vertical section. Fig. 2 is a similar view, part of the spoon handle being broken out and a portion of the attachment being shown in section; Fig. 3 is a cross-sectional view on the line 3—3 of Fig. 1; Fig. 4 is a side elevation of the device in the folded position; and Fig. 5 is an inverted plan view.

In carrying out my invention, a clip 10 is adapted to be secured to the handle 11 of a spoon, by means of a resilient fastener 12. The clip comprises a forked front member 14 and an integral rear member 15 that are formed on a shank 16, both members being resilient. The rear member 15 is given a curved form to present a hook 17 near the lower end and the free ends of the fork 14 and the member 15 are out-turned or flared as at 14ª, 15ª, to facilitate the slipping of the clip over the upper edge of a cooking utensil 18, the hook 17 being adapted to engage the usual rib 19.

The shank 16 terminates at its upper end in a forwardly offset member 20 and at the base of said member, the shank is formed with an opening 21, through which the shank of the fastener 12 extends, the rear end of said shank being riveted to the spoon handle as at 22. The fastener at its forward end is bent upwardly at approximately a normal angle as at 23, and then forwardly offset as at 24. Portion 23 extends upwardly through a hole 11ª in the spoon handle 11, so that the forwardly offset terminal 24 lies at the front of the handle.

The shank of the fastener 12 is resilient, constituting a plate spring and clamps the terminal 20 of the clip, between said shank and the under side of the handle. The resiliency of the shank, however, permits the clip to be moved from the folded position indicated in Fig. 4, ranging lengthwise of the handle to a position at a pronounced angle to the spoon handle as in Figs. 1 and 2. In the latter position the clip may be passed downward over the rib 19 of the cooking utensil to sustain the spoon above the edge of the utensil. In both positions of the clip 10, the resilient shank of the fastener 12 will properly sustain the clip, while the terminal 24 serves to prevent the complete withdrawal of the fastener through the hole 11ª of the handle.

The device it will be obvious is applicable to the handle of forks or similar articles of flat ware, as well as to spoons.

Having thus described my invention, I claim as new and desire to secure by Letters Patent:—

The combination with the handle of a spoon or the like, having a transverse hole therein, of an attachment consisting of a clip and a fastener therefor, the clip presenting fork members at the front and a rear member having a hook at its lower end, said members being resilient, a shank integral with the said members and extending upwardly therefrom, the shank terminating at its upper end in a lateral offset and having a hole at the base of the offset, and the said fastener comprising a resilient shank secured to the handle at one end and extending through the hole of the clip, an upwardly extending portion at an angle to the resilient shank, said portion extending through the hole in the handle, and an offset terminal on said upwardly extending portion, the terminal being approximately parallel with the handle and lying at the front of the latter.

In testimony whereof I have signed my name to this specification in the presence of two subscribing witnesses.

JOSEPH WILLIAM LUNDAHL.

Witnesses:
ANTON J. NORBERG,
GEORGE SANGSTER.